US009348768B2

(12) United States Patent
Li

(10) Patent No.: US 9,348,768 B2
(45) Date of Patent: May 24, 2016

(54) METHOD FOR IMPLEMENTING ENCRYPTION IN STORAGE CARD, AND DECRYPTION METHOD AND DEVICE

(71) Applicant: ZTE CORPORATION, Shenzhen, Guangdon Province (CN)

(72) Inventor: Xipeng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/426,081

(22) PCT Filed: Jul. 22, 2013

(86) PCT No.: PCT/CN2013/079812
§ 371 (c)(1),
(2) Date: Mar. 4, 2015

(87) PCT Pub. No.: WO2013/178154
PCT Pub. Date: May 12, 2013

(65) Prior Publication Data
US 2015/0248356 A1 Sep. 3, 2015

(30) Foreign Application Priority Data
Sep. 5, 2012 (CN) .......................... 2012 1 0325239

(51) Int. Cl.
*G06F 21/62* (2013.01)
*G06F 12/14* (2006.01)
*G06F 21/64* (2013.01)
*G06F 21/79* (2013.01)

(52) U.S. Cl.
CPC ........ *G06F 12/1408* (2013.01); *G06F 21/6209* (2013.01); *G06F 21/64* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| 6,014,745 A | 1/2000 | Ashe | |
|---|---|---|---|
| 2003/0135748 A1* | 7/2003 | Yamada | G06F 21/10 713/193 |

(Continued)

FOREIGN PATENT DOCUMENTS

| CN | 101262669 A | 9/2008 |
|---|---|---|
| CN | 101562040 A | 10/2009 |

(Continued)

OTHER PUBLICATIONS

European Search Report dated May 26, 2015 of European patent Application No. 13796959.8.

*Primary Examiner* — David Pearson
(74) *Attorney, Agent, or Firm* — Plumsea Law Group, LLC

(57) ABSTRACT

A method for implemented encryption in a memory card, and a decryption method and device, and the method includes: receiving an input encryption key; requesting a subscriber identity card for authenticating the encryption key; after the authentication is successful, using the encryption key to encrypt plaintext data selected in the memory card the to generate encrypted data; generating encryption status information, wherein the encryption status information describes non-confidential information of the encrypted data. By using the encryption key in the subscriber identity card to encrypt data in the memory card, a user can freely select the data to be encrypted in the memory card, thereby enhancing data security in the memory card, facilitating the user operation, and enhancing the user experience.

9 Claims, 3 Drawing Sheets

(56) References Cited

U.S. PATENT DOCUMENTS

| | | | | |
|---|---|---|---|---|
| 2004/0157584 A1* | 8/2004 | Bensimon | ........... | H04L 63/0853 455/411 |
| 2004/0209651 A1* | 10/2004 | Tsukamoto | ........... | H04W 12/06 455/558 |
| 2005/0235143 A1* | 10/2005 | Kelly | ............... | G06F 21/10 713/165 |
| 2009/0217058 A1 | 8/2009 | Obereiner et al. | | |
| 2010/0064341 A1* | 3/2010 | Aldera | ............... | H04L 63/102 726/1 |

FOREIGN PATENT DOCUMENTS

| | | |
|---|---|---|
| CN | 102799540 A | 11/2012 |
| CN | 102866960 A | 1/2013 |

\* cited by examiner

US 9,348,768 B2

METHOD FOR IMPLEMENTING ENCRYPTION IN STORAGE CARD, AND DECRYPTION METHOD AND DEVICE

CROSS-REFERENCE TO RELATED APPLICATION(S)

This application is the U.S. National Phase application of PCT application number PCT/CN2013/079812 having a PCT filing date of Jul. 22, 2013, which claims priority of Chinese patent application 201210325239.7 filed on Sep. 5, 2012, the disclosures of which are hereby incorporated by reference.

TECHNICAL FIELD

The present document relates to data security technology, and more particularly, to a method for implementing encryption in a memory card, a decryption method and device.

BACKGROUND OF THE INVENTION

Mainstream smart phones support subscriber identity modules and memory cards, and the application of external memory card is very popular, and the capacity of memory card keeps rising, wherein a lot of user data are stored, therefore its data security is a growing concern.

How to improve data security in the memory card has become a very important new topic, currently there are no special protection measures for the access to an internal or external memory card in a terminal, once others obtain the terminal, a variety of information including images and videos in the memory card can be viewed freely, and there is a relatively big risk in data security.

There are the following problems in the related art: currently there are no special protection measures for the access to an internal or external memory card in the smart phone, and there is a relatively big risk in data security.

SUMMARY

To solve the technical problem, the embodiment of the present document provides a method for implementing encryption in a memory card, a decryption method and device, for solving the problem in the related art that currently there is no special protective measure on an access to a memory card, and there is a relatively big risk on data security.

To solve the abovementioned technical problem, the embodiment of the present document provides a method for implementing encryption in a memory card, comprising:
receiving an input encryption key;
requesting a subscriber identity card for authenticating the encryption key;
after the authentication is successful, using the encryption key to encrypt plaintext data selected in the memory card to generate encrypted data;
generating encryption status information, wherein the encryption status information describes non-confidential information of the encrypted data.

In the method, before the step of receiving an input encryption key, it further comprises: prompting to input the encryption key in a terminal, and prompting to store the encryption key in the subscriber identity card.

In the method, the step of requesting a subscriber identity card for authenticating the encryption key comprises:
requesting the subscriber identity card for authenticating the encryption key;
sending the encryption key to the subscriber identity card;
receiving an authentication result from the subscriber identity card.

A method for decrypting in a memory card, comprising:
detecting an access request;
determining what to be accessed are encrypted data according to the access request and pre-stored encryption status information;
receiving an input decryption key;
requesting a subscriber identity card for authenticating the decryption key; after the authentication is successful, using the decryption key to decrypt the encrypted data in the memory card to generate plaintext data.

In the method, it is to further comprise: verifying an initial key, and after the verification is successful, modifying an encryption key and the decryption key.

A device for implementing encryption, comprising:
a management unit, configured to receive an input encryption key;
a key authentication unit, configured to request a subscriber identity card for authenticating the encryption key;
an encryption unit, configured to, after the authentication is successful, use the encryption key to encrypt plaintext data selected in a memory card to generate encrypted data;
an encryption information storage unit, configured to generate encryption status information, wherein the encryption status information describes non-confidential information of the encrypted data.

In the device, it is to further comprise: the subscriber identity card, configured to store the encryption key and a decryption key; and also configured to store an initial key, verify the initial key, and modify the encryption key and the decryption key after the verification is successful.

In the device, the decryption key in the subscriber identity card comprises an ADM code, a PIN1 code, and a PIN2 code.

In the device, the key authentication unit comprises:
a first module, configured to request the subscriber identity card for authenticating the key;
a second module, configured to send the encryption key to the subscriber identity card;
a third module, configured to receive an authentication result from the subscriber identity card.

A device for implementing decryption, comprising:
an inquiry unit, configured to detect an access request; and determine what to be accessed are encrypted data according to the access request and pre-stored encryption status information; and receive an input decryption key;
an access authentication unit, configured to request a subscriber identity card for authenticating the decryption key;
a decryption unit, configured to, after the authentication is successful, use the decryption key to decrypt the encrypted data in a memory card to generate plaintext data.

The beneficial effects of the abovementioned technical solution in accordance with the embodiment of the present document are as follows: by using the encryption key in the subscriber identity card to encrypt data in the memory card, the user can freely select data to be encrypted in the memory card, thereby enhancing the data security in the memory card, facilitating the user operation, and enhancing the user experience.

PREFERRED EMBODIMENTS OF THE INVENTION

To make the technical problem to be solved in the embodiment of the present document, the technical solutions and advantages clearer, hereinafter it will be described in detail in conjunction with the accompanying drawings and specific embodiments.

In the technology provided in the embodiment of the present document, and in the process of accessing data in a memory card, it needs to be authenticated by the subscriber identity card—such as the SIM card. The terminal, especially the mobile terminal, comprises an insertable and separable memory card device—such as T-Flash card, in order to expand the available storage space of the terminal, and support the applications of subscriber identification card.

Figure 1:
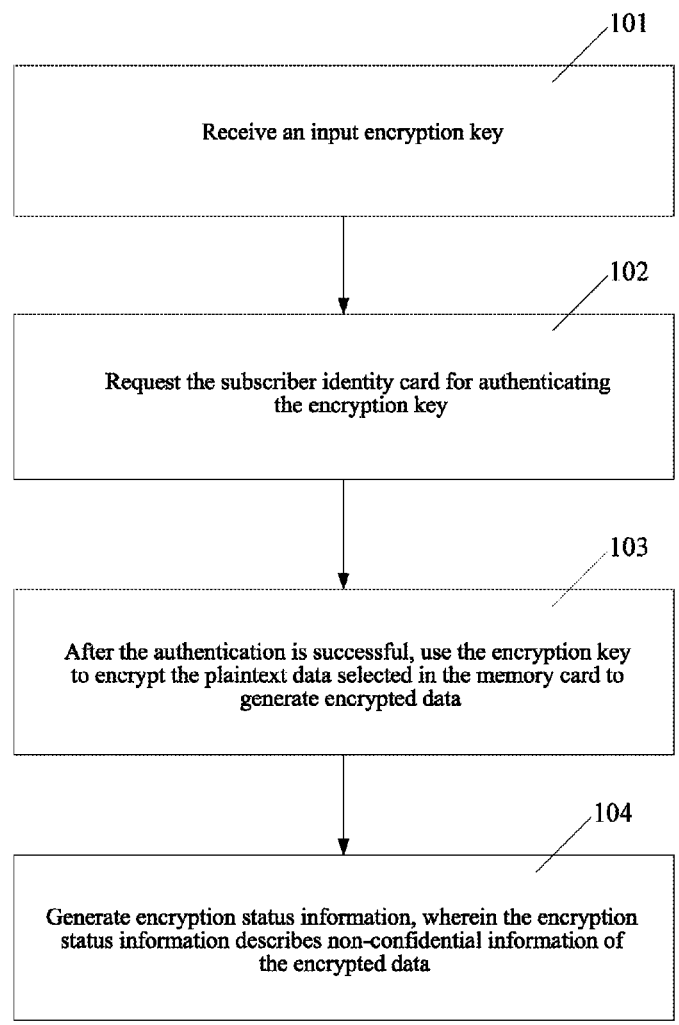
FIG. 1 shows a schematic diagram of the process of a method for implementing encryption in a memory card in accordance with an embodiment of the present document.

To this end, the embodiment of the present document provides a method for implementing encryption in the memory card, and as shown in FIG. 1, the method comprises:

In step 101, it is to receive an input encryption key;

In step 102, it is to request the subscriber identity card for authenticating the encryption key;

In step 103, after the authentication is successful, it is to use the encryption key to encrypt the plaintext data selected in the memory card to generate encrypted data;

In step 104, it is to generate encryption status information, wherein the encryption status information describes non-confidential information of the encrypted data.

By applying the technical solution provided herein and using the encryption key in the subscriber identity card to encrypt data in the memory card, the user can freely select data to be encrypted in the memory card, thereby enhancing the data security in the memory card, facilitating the user operation, and enhancing the user experience.

In one preferred embodiment, before receiving the input encryption key, it is to further comprise:

prompting to input the encryption key in the terminal, and prompting to store the encryption key in the subscriber identity card.

In one preferred embodiment, requesting the subscriber identity card for authenticating the encryption key specifically comprises:

requesting the subscriber identity card for authenticating the encryption key;

sending the encryption key to the subscriber identity card;

receiving an authentication result from the subscriber identity card.

Data in the memory card can be a file, a plurality of files, folders, and so on. The subscriber identity card comprises, but is not limited to, a SIM card, a User Identity Model (UIM) card and an SD card; the memory card comprises, but is not limited to, an SD card, a TF (Trans FLash) card, a Micro SD card, a CF (Compact Flash) card, a terminal built-in memory card as well as space, and so on.

The embodiment of the present document provides a method for decrypting in a memory card, and the method comprises:

detecting an access request;

determining what to be accessed are encrypted data according to the access request and the pre-stored encryption status information;

receiving an input decryption key;

requesting the subscriber identity card for authenticating the decryption key;

after the authentication is successful, using the decryption key to decrypt the encrypted data in the memory card to generate plaintext data.

Wherein, after determining what to be accessed are the encrypted data, a session interface needs to be displayed to prompt the user to enter the key, it may also wait for receiving the decryption key input by the user in the session interface.

In one preferred embodiment, it is to further comprise:

after successfully verifying the initial key, modifying the encryption key and the decryption key.

The subscriber identity card stores the key, if the user knows the initial key, the user can modify the key. The key in the subscriber identity card comprises, but is not limited to, advanced disk manager (ADM), personal identification code 1 (PIN1), Personal Identification Number 2 (PIN2), and so on.

Figure 2:
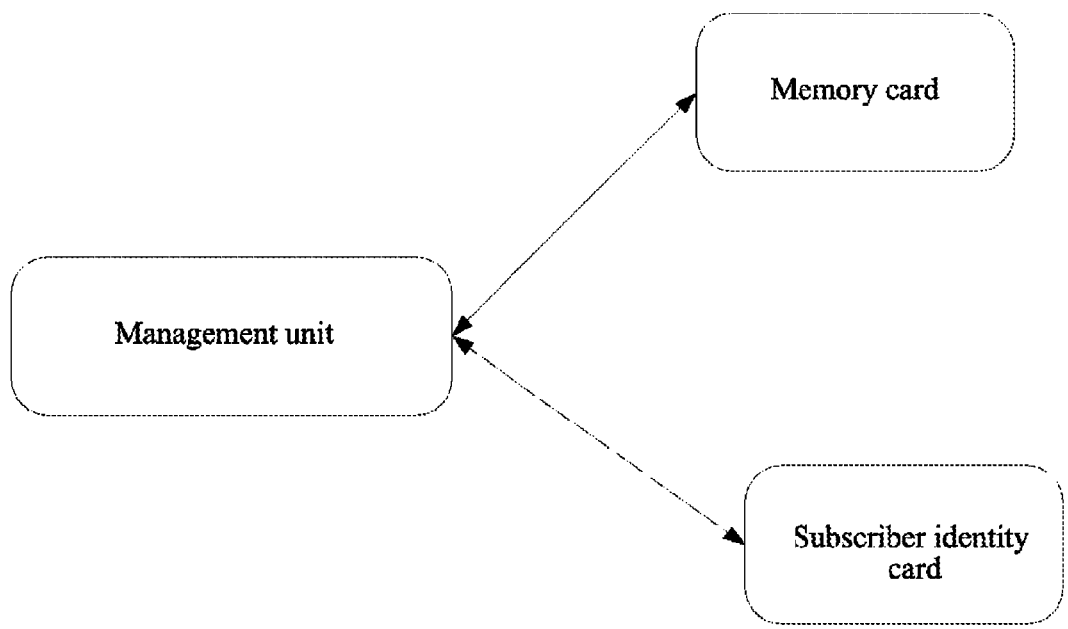
FIG. 2 shows a schematic diagram of a relationship between the memory card and the subscriber identity card in accordance with an embodiment of the present document.

In one application scenario, as shown in FIG. 2, the encryption process comprises:

after the user selects data, the management unit prompts the user whether to encrypt the data or not, after confirming that the user needs to encrypt the data, prompts the user to input the key in the subscriber identity card.

After the user inputs the key in the subscriber identity card, the management unit requests the subscriber identity card for key authentication; and after the subscriber identity card authenticates successfully, it returns the key to the management unit;

the management unit uses the key to encrypt the data selected by the user in the memory card.

after encrypting the data in the memory card, the management unit generates and stores encryption status information.

The decryption process comprises:

when the user accesses the data in the memory card, it is to inquire the encryption status information and judge whether the data accessed by the user are encrypted or not, when determining that the data accessed by the user are encrypted, prompt the user to input the key;

the management unit requests the subscriber identity card for authenticating the key input by the user, and receives the key returned by the subscriber identity card after the authentication is successful;

the management unit uses the key to decrypt the encrypted data.

Figure 3:
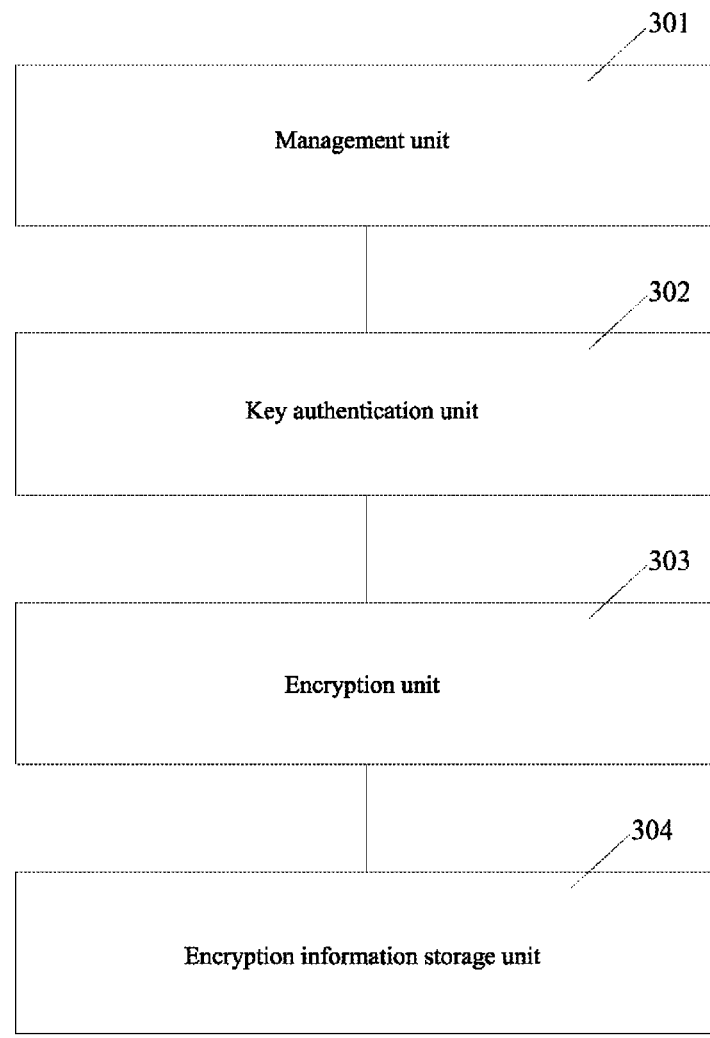
FIG. 3 shows a schematic diagram of the structure of a device for implementing encryption in accordance with an embodiment of the present document.

The embodiment of the present document provides a device for implementing encryption, as shown in FIG. 3, comprising:

a management unit 301, configured to receive an input encryption key;

a key authentication unit 302, configured to request the subscriber identity card for authenticating the encryption key;

an encryption unit 303, configured to, after the authentication is successful, use the encryption key to encrypt the plaintext data selected in the memory card to generate encrypted data;

an encryption information storage unit 304, configured to generate encryption status information, wherein the encryption status information describes non-confidential information of the encrypted data.

The terminal comprises a mobile terminal and a fixed terminal.

In one preferred embodiment, it is to further comprise:

a subscriber identity card, configured to store the encryption key and the decryption key;

and the initial key, configured to verify the initial key, and modify the encryption key and the decryption key after the verification is successful.

In one preferred embodiment, the decryption key in the subscriber identity card comprises an ADM code, a PIN1 code, and a PIN2 code.

In one preferred embodiment, it is to further comprise:

an inquiry unit, configured to detect an access requests; and determine what to be accessed are the encrypted data according to the access request and the pre-stored encryption status information; and receive the input decryption key;

an access authentication unit, configured to request the subscriber identity card for authenticating the decryption key; and a decryption unit, configured to, after the authentication is successful, use the decryption key to decrypt the encrypted data in the memory card to generate plaintext data.

In one preferred embodiment, the key authentication unit 302 comprises:

a first module, configured to request the subscriber identity card for authenticating the key;

a second module, configured to send the encryption key to the subscriber identity card;

a third module, configured to receive an authentication result from the subscriber identity card.

In one application scenario, each unit in the terminal uses the following mode to cooperate to complete the encryption and decryption of the data in the memory card, comprising that:

when the user inputs the key in the subscriber identity card, the key authentication unit 302 requests the subscriber identity card for key authentication, and receives an authentication result returned by the subscriber identity card after the authentication is successful, and send the key to the encryption unit 303;

the key encryption unit 303 receives the key sent by the key authentication unit 302, and uses the key to encrypt the user's data which need to be encrypted in the memory card, and generates encryption status information;

the encryption information storage unit 304 stores the encryption status information generated by the encryption unit 303.

The inquiry unit inquires the encryption status information in the encryption information storage unit 304 when the user accesses the data in the memory card, and judges whether the data accessed by the user are encrypted by the encryption unit 303 or not, and when determining that the data accessed by the user are encrypted, notifies the access authentication unit to request the user to input the key;

after receiving the notification sent by the inquiry unit for requesting the user to input the key, the access authentication unit prompts the user to input the key, requests the subscriber identity card for authenticating the key input by the user, receives an authentication success or failure result from the subscriber identity card, and sends the key to the decryption unit if the authentication is successful;

the decryption unit receives the key sent by the access authentication unit, and uses the key to decrypt the encrypted file.

The embodiment of the present document provides a device for implementing decryption, comprising:

an inquiry unit, configured to detect an access request; according to the access request and the pre-stored encryption status information, determine what to be accessed are the encrypted data; and receive the input decryption key;

an access authentication unit, configured to request the subscriber identity card for authenticating the decryption key;

a decryption unit, configured to, after the authentication is successful, use the decryption key to decrypt the encrypted data in the memory card to generate plaintext data.

The advantages of using the present solution are: by using the encryption key in the subscriber identity card to encrypt data in the memory card, the user can freely select data to be encrypted in the memory card, thereby enhancing the data security in the memory card, and in the decryption process, it needs to request the subscriber identity card for authenticating the decryption key, and the decryption can only be performed after the authentication is successful, meanwhile the data security in the memory card is guaranteed, and the keys applied in the encryption and decryption processes are stored in the subscriber identity card, thereby facilitating the user operation and enhancing the user experience.

The above description are preferred embodiments of the present document, and it should be pointed out that, for those ordinarily skilled in the art, many improvements and modifications may be made without departing from the principle of present document, and such improvements and modifications should also be considered in the protection scope of the present document.

INDUSTRIAL APPLICABILITY

The beneficial effects of the abovementioned technical solution in accordance with the embodiment of the present document are as follows: by using the encryption key in the subscriber identity card to encrypt data in the memory card, the user can freely select data to be encrypted in the memory card, thereby enhancing the data security in the memory card, facilitating the user operation, and enhancing the user experience.

I claim:

1. A method for encrypting data in a memory card, comprising:
   receiving an encryption key input by a user;
   requesting a subscriber identity card for authenticating the encryption key;
   after the authentication is successful, using the authenticated encryption key to encrypt data selected by the user in the memory card to generate encrypted data;
   generating encryption status information, wherein the encryption status information describes non-confidential information of the encrypted data;
   wherein, the encryption key authenticated in the subscriber identity card comprises administrative codes (ADM), a Personal Identification Number1 (PIN1) code, and a Personal Identification Number2 (PIN2) code.

2. The method of claim 1, wherein, before the step of receiving an encryption key input by a user, the method further comprises:
   prompting the user to input the encryption key in a terminal, and prompting the user on whether to store the encryption key in the subscriber identity card.

3. The method of claim 1, wherein, the step of requesting a subscriber identity card for authenticating the encryption key comprises:
   requesting the subscriber identity card for authenticating the encryption key;
   sending the encryption key to the subscriber identity card;
   receiving the authenticated encryption key from the subscriber identity card.

4. A method for decrypting data in a memory card, comprising:
  detecting an access request;
  determining whether data to be accessed is encrypted data according to the access request and pre-stored encryption status information;
  receiving decryption key input by a user;
  requesting a subscriber identity card for authenticating the decryption key;
  after the authentication is successful, using the authenticated decryption key to decrypt the encrypted data in the memory card to generate data;
  wherein, the decryption key authenticated in the subscriber identity card comprises administrative codes (ADM), a Personal Identification Number1 (PIN1) code, and a Personal Identification Number2 (PIN2) code.

5. The method of claim 4, wherein, the method further comprises:
  verifying an initial key, and after the verification is successful, modifying an encryption key and the decryption key.

6. A device for encrypting data in a memory card, comprising a processor and a storage device, wherein the storage device stores processor-executable programs, and the programs comprise:
  a management unit, configured to receive an encryption key input by a user;
  a key authentication unit, configured to receive the encryption key from the management unit, request a subscriber identity card for authenticating the encryption key;
  an encryption unit, configured to, after the authentication is successful, use the authenticated encryption key to encrypt data selected by the user in a memory card to generate encrypted data, and generate encryption status information, wherein the encryption status information describes non-confidential information of the encrypted data;
  an encryption information storage unit, configured to store the encryption status information generated by the encryption unit;
  wherein, the encryption key authenticated in the subscriber identity card comprises administrative codes (ADM), a Personal Identification Number1 (PIN1) code, and a Personal Identification Number2 (PIN2) code.

7. The device of claim 6, further comprising:
  the subscriber identity card, configured to store the encryption key and a decryption key;
  and, also configured to store an initial key, verify the initial key, and modify the encryption key and the decryption key after the verification is successful.

8. The device of claim 6, wherein, the key authentication unit comprises:
  a first module, configured to request the subscriber identity card for authenticating the encryption key;
  a second module, configured to send the encryption key to the subscriber identity card;
  a third module, configured to receive the authenticated encryption key from the subscriber identity card.

9. A device for decrypting data in a memory card, comprising a processor and a storage device, wherein the storage device stores processor-executable programs, and the programs comprise:
  an inquiry unit, configured to detect an access request, and determine whether data to be accessed are encrypted data according to the access request and pre-stored encryption status information; and receive decryption key input by a user;
  an access authentication unit, configured to request a subscriber identity card for authenticating the decryption key;
  a decryption unit, configured to, after the authentication is successful, use the authenticated decryption key to decrypt the encrypted data in a memory card to generate data;
  wherein, the decryption key authenticated in the subscriber identity card comprises administrative codes (ADM), a Personal Identification Number1 (PIN1) code, and a Personal Identification Number2 (PIN2) code.

* * * * *